June 16, 1964  B. SAMUELSON  3,137,443
VECTOR CALCULATOR
Filed April 2, 1962  2 Sheets-Sheet 1
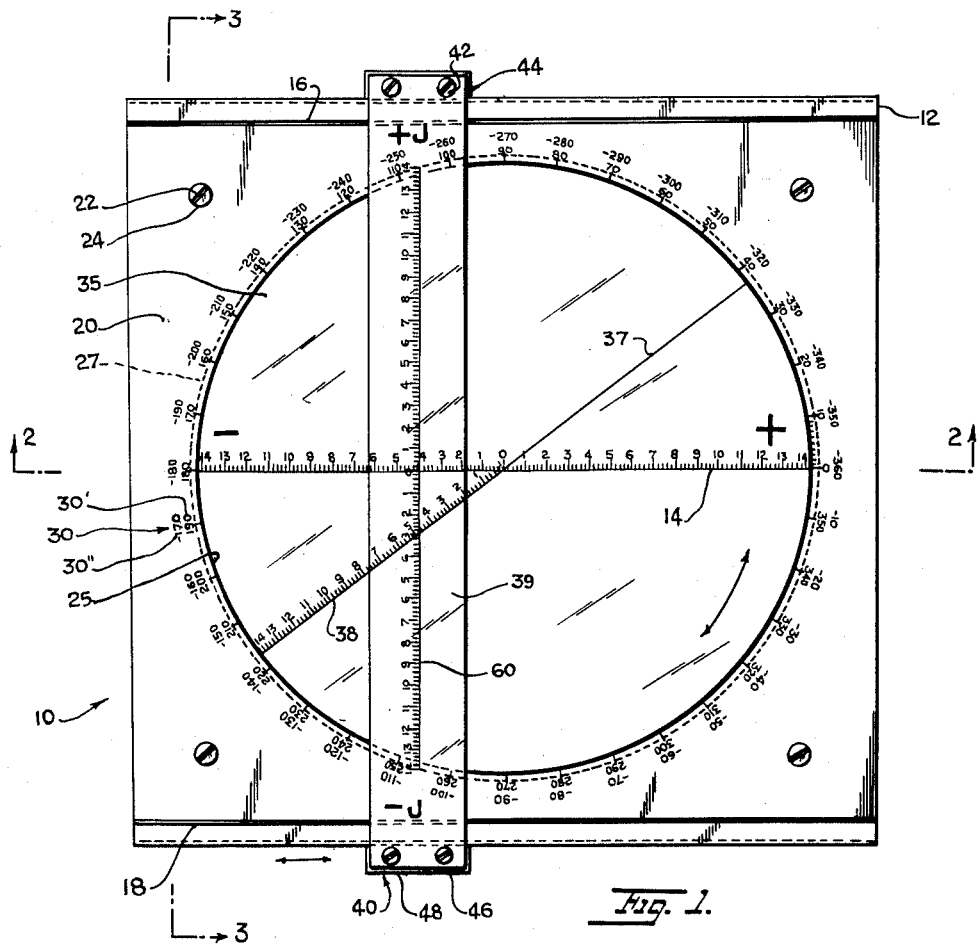
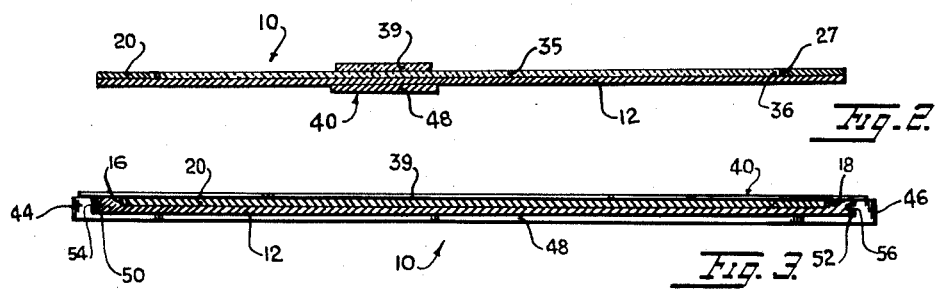
INVENTOR.
BENJAMIN SAMUELSON
BY
*ATTORNEY*

INVENTOR.
BENJAMIN SAMUELSON
BY
ATTORNEY

United States Patent Office 3,137,443
Patented June 16, 1964

3,137,443
VECTOR CALCULATOR
Benjamin Samuelson, Kew Gardens, N.Y.
(83—84 116th St., Queens, New York 15, N.Y.)
Filed Apr. 2, 1962, Ser. No. 184,419
4 Claims. (Cl. 235—61)

This invention concerns an instrument for conversion of vectors between polar and rectangular coordinates and for determining trigonometric functions of angles.

Engineers, navigators, technicians, mechanics, students and teachers of trigonometry and analytic geometry have long felt the need for an instrument which would quickly and accurately determine trigonometric functions and to convert between polar and rectangular coordinates, all with proper sign indications. This need is met by the present invention which is basically a device for solving a right triangle in any of four plane geometrical quadrants.

It is therefore a principal object of the invention to provide a device for simplifying conversion between polar and rectangular coordinates, with the mathematical solution graphically displayed on the device.

A further object is to provide a device for obtaining numerical readings of all the trigonometric functions of any angle with proper sign.

Another object is to provide a calculator device having a fixed, circular scale graduated in angular degrees from 0° to +360° and from 0° to −360°, a fixed horizontal diametral linear scale, a sliding vertical linear scale, and a radial linear scale rotatable with respect to the circular scale, two of the linear scales being graduated in units and fifths from −14.14 to +14.14 ($-10\sqrt{2}$ to $+\sqrt{2}$), and the other from 0 to $+10\sqrt{2}$.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a plan view of a device embodying the invention.

FIG. 2 and FIG. 3 are sectional views taken on lines 2—2 and 3—3, respectively, of FIG. 1.

Figure 4:
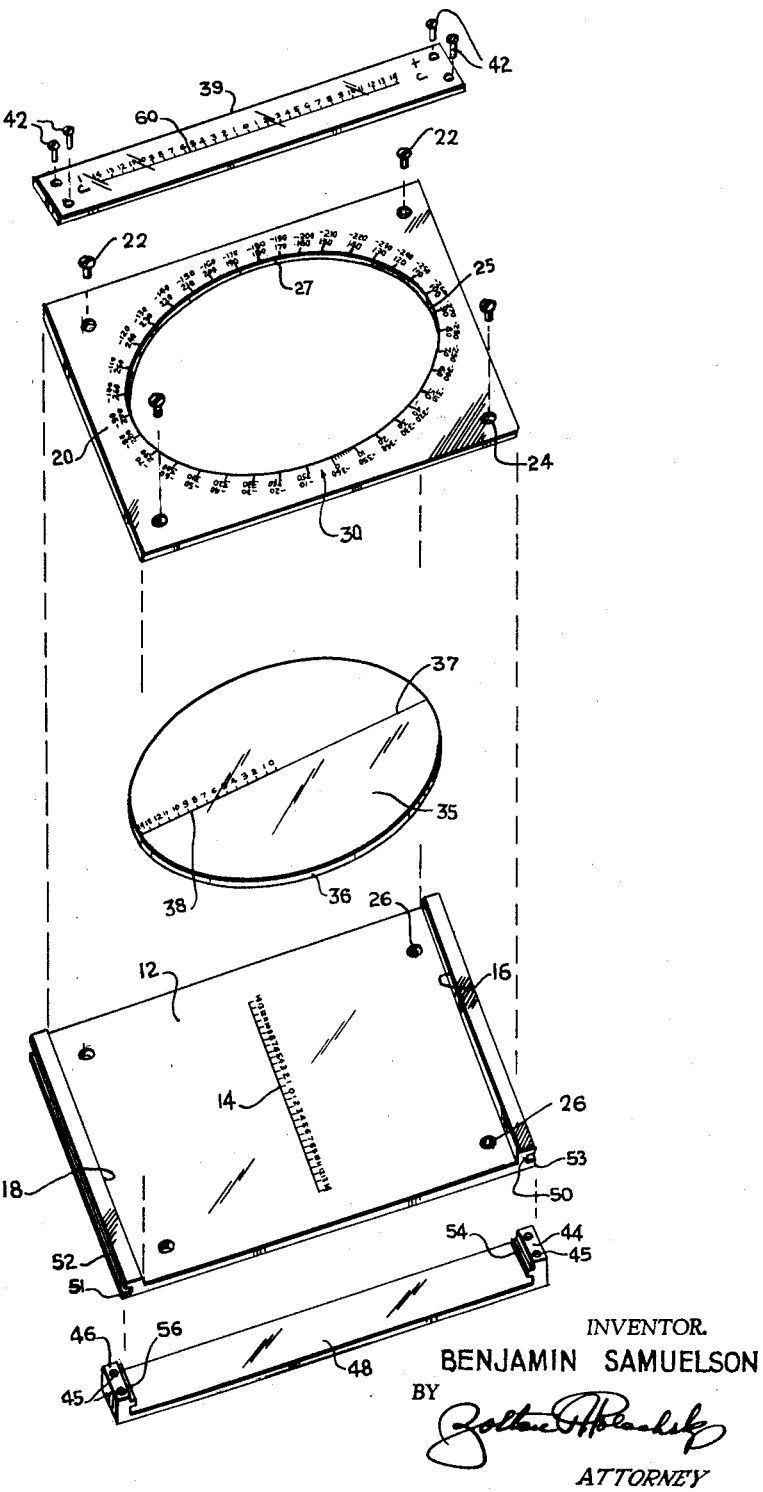
FIG. 4 is an exploded perspective view of components of the device.

Referring to the drawings, there is shown the instrument 10 including a rectangular base 12 having a horizontal linear scale 14 inscribed transversely across its upper surface with graduations by fifths from −14.14 to +14.14. While I have used a scale length extending from $-10\sqrt{2}$ to $+10\sqrt{2}$, it will, of course, be understood that another choice of scale length might be used depending upon the results and accuracy desired. The base plate has end rails 16, 18 formed at opposite ends defining a recess in which is disposed a rectangular top plate 20. The plate 20 is secured by screws 22 inserted through corner holes 24 in the top plate and engaged in threaded holes 26 in the base plate (see FIG. 4). The corner holes 24 coact with the holes 26 to position plate 20 properly on the base plate 12.

The top plate 20 has a circular hole 25 around the rim of which is inscribed a circumferentially extending double scale 30 graduated in angular degrees. The inner part 30′ of scale 30 is graduated from 0° counterclockwise to +360°. The outer part 30″ is graduated clockwise from 0° to −360°. Scale 14 extends diametrally with respect to scale 30 from 0° to +180°, −180°. The rim 27 of top plate 20 is beveled inwardly.

Rotatably fitted in the beveled rim 27 of plate 20 is a transparent circular plate 35. This plate has an outwardly beveled edge 36 mating with beveled rim 27. Rim 27 serves as a guide constraining plate 35 to rotating circularly and holding the plate 35 on base plate 12. Plate 35 is thus held with its center coinciding with 0 on scale 14. Plate 35 is inscribed with a radial linear scale 38 graduated in units and fifths from 0 to 14.14 (0 to $10\sqrt{2}$). The plate is also shown with an extended line 37 so that for any setting the angle $\theta$ and the angle $\theta+180$ can be read simultaneously.

Slidably disposed over plates 20 and 35 is a transparent strip or rectangular plate 39 of a slide assembly 40. This strip 39 is secured by screws 42 to lands 44, 46 formed at the opposite ends of a base or backing plate 48. The lands have threaded holes 45 engaging screws 42; see FIG. 4. The back is a rectangular member which slides along the bottom of plate 12. Grooves 50, 52 are formed in outer edges 51, 53 of base plate 12. Ridges 54, 56 formed on inner opposing edges of lands 44, 46 slidably engaged in grooves 50, 52. Strip 39 is inscribed with a linear scale 60 graduated in units and fifths from −14.14 through 0 to +14.14 ($-10\sqrt{2}$ to $+10\sqrt{2}$). Scale 60 is perpendicular to scale 14. The diameter of hole 25 in plate 20 can be larger than the diameter from −14.14 to +14.14 on scale 14. When slide 40 is moved transversely across the instrument to its center, then 0 on scale 60 coincides with the center of plate 35 and 0 on scale 14. Scale 14 is visible through the transparent plate 35 and transparent strip 39. Thus, all four scales 14, 30, 38 and 60 are simultaneously visible in all positions of the plate 35 and strip 39 on plates 12 and 20. Plate 35 and strip 39 should be made of rigid transparent plastic sheet material, while plates 12 and 20 and slide base or backing plate 48 may be made of rigid metal or plastic sheet material.

The operation of the instrument will be explained with reference to the following examples:

EXAMPLE 1

*To Convert From Rectangular to Polar Coordinates*

Suppose it is desired to convert rectangular coordinates (−4 −J3) to polar coordinates. The slide 40 will be set so that vertical scale 60 intersects horizontal scale 14 at −4. Vector plate 35 is rotated so that radial scale 38 intersects −3 on vertical scale 60. The magnitude of the desired polar vector is then read on scale 38 at +5. The angle of the polar vector is read on circular scales 30 where it is intersected by radial scale 38. As is seen in FIG. 1, in which the several scales have the settings described in this example, the desired angle is +216.9° in scale portion 30′, or −143.1° in outer scale portion 30″. The polar coordinates are thus determined by the instrument as (+5, +216.9°) or (+5, −143.1°).

EXAMPLE 2

*To Convert From Polar Coordinates to Rectangular Coordinates*

Suppose it is desired to convert polar coordinates (+5, +216.9°) or (+5, −143.1°) to rectangular coordinates. A procedure which is the reverse of that followed in Example 1 is followed. Scale 38 is set to intersect scales 30 at +216.9° or −143.1°. Scale 60 is set to intersect scale 38 at the polar magnitude +5 on the radial scale 38. Then the rectangular coordinates are read directly off the instrument on scales 14 and 60, respectively, as (−4 −J3).

EXAMPLE 3

*To Determine Trigonometric Function of an Angle*

Suppose it is desired to find the trigonometric sine, cosine and tangent functions of +216.9° or −143.1° using the settings of the scales shown in FIG. 1.

$$\sin e = \frac{\text{vertical side (length of scale 60)}}{\text{hypotenuse (length of scale 38)}} = \frac{-3}{+5} = -0.6$$

$$\cos ine = \frac{\text{horizontal side (on scale 14)}}{\text{hypotenuse (on scale 38)}} = \frac{-4}{+5} = -0.8$$

$$\tan gent = \frac{\text{vertical side (on scale 60)}}{\text{horizontal side (on scale 14)}} = \frac{-3}{-4} = +0.75$$

To simplify the finding of the numerical values of the trigonometric functions without making arithmetical calculations and to make the instrument more direct reading, the denominator portion of each trigonometric ratio may be set up as a decimal 0.1, 1.0 or 10 depending on the angle under consideration. Thus, the sine of angle +216.9° or −143.1° can be found by rotating disk 35 until scale 38 intersects +216.9° or −143.1° on scales 30. Then slide 40 is moved laterally until scale 60 intersects scale 38 at +10 on scale 38. The sine is now read directly from scale 60 where it intersects scale 39 at +10. The instrument's sine value reading will then be read on scale 60 at −6.0. The sine is determined as −6.0 divided by +10 which is −0.6.

In similar fashion numerical values of secant, cosecant and cotangents of angles may be found by taking the ratio of the two sides of the triangle corresponding to the trigonometric function being determined. The denominator of the ratio will be set at 0.1, 1.0 or 10 on the appropriate scale 14, 38 or 60 for direct reading of function values.

It will be noted from the above examples that the vector signs of the functions and coordinates determined are positively indicated by the instrument. The numerical values of the functions and vectors as read from the scales are plus (+) or minus (−) as marked on the scales.

If desired, the positive values of the scales may be printed in one color ink such as black and the negative values may be printed in another color such as red. It is also desirable to inscribe another scale in radians alongside the numerical markings in degrees of scales 30. It is further desirable to have the formulae for the various trigonometric functions inscribed on the bottom surface of base plate 12 for ready reference.

The instrument may be made in various sizes. Larger sizes will, of course, permit more graduations to be inscribed in the several scales and thus, provide more accurate readings. The instrument will be found a useful accessory to engineers and others concerned with making trigonometric calculations and solving numerical problems involving vectors.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. An instrument for determining trigonometric functions and for converting between polar and rectangular coordinates, comprising a base plate, a horizontal linear scale extending transversely across the plate, a transparent circular plate on the base plate, said horizontal linear scale being substantially equal in length to the diameter of the transparent circular plate, said horizontal linear scale being disposed diametrally of the transparent circular plate and being visible therethrough, said circular plate having a radial linear scale thereon, a top plate on the base plate having a circular hole, said circular plate being rotatable on the base plate in said hole in the top plate, the hole in the top plate having a circular rim inscribed circumferentially with a circular scale in angular degrees, a slide engaged with the base plate and guided thereby to lateral movements parallel to the horizontal linear scale, said slide including a transparent strip extending over the top plate and circular plate, said strip being inscribed with a vertical linear scale disposed perpendicular to the first linear scale, whereby the vertical scale intersects the horizontal, radial and circular scales at all positions of the slide and circular plate on the base plate, and the radial scale extends from the center of the horizontal scale to the circular scale in all positions of the circular plate.

2. An instrument for determining trigonometric functions and for converting between polar and rectangular coordinates, comprising a base plate, a horizontal linear scale extending transversely across the plate, a transparent circular plate on the base plate, said horizontal linear scale being substantially equal in length to the diameter of the transparent circular plate, said horizontal linear scale being disposed diametrally of the transparent circular plate and being visible therethrough, said circular plate having a radial linear scale thereon, a top plate on the base plate having a circular hole, said circular plate being rotatable on the base plate in said hole in the top plate, the hole in the top plate having a circular rim inscribed circumferentially with a circular scale in angular degrees, a slide engaged with the base plate and guided thereby to lateral movements parallel to the horizontal linear scale, said slide including a transparent strip extending over the top plate and circular plate, said strip being inscribed with a vertical linear scale disposed perpendicular to the first linear scale, the horizontal linear scale being graduated uniformly in fifths and units from −14.14 through 0 to +14.14, the radial scale being graduated uniformly in fifths and units from 0 to 14.14, and the vertical linear scale being graduated uniformly in fifths and units from −14.14 through 0 to +14.14, whereby the vertical scale intersects the horizontal, radial and circular scales at all positions of the slide and circular plate on the base plate, and the radial scale extends from the center of the horizontal scale to the circular scale in all positions of the circular plate.

3. An instrument for determining trigonometric functions and for converting between polar and rectangular coordinates, comprising a base plate, a horizontal linear scale extending transversely across the plate, a transparent circular plate on the base plate, said horizontal linear scale being substantially equal in length to the diameter of the transparent circular plate, said horizontal linear scale being disposed diametrally of the transparent circular plate and being visible therethrough, said circular plate having a radial linear scale thereon, a top plate on the base plate having a circular hole, said circular plate being rotatable in said hole in the top plate, said hole having a circular edge inscribed circumferentially with a circular scale in angular degrees, a slide engaged with the base plate and guided thereby to lateral movements parallel to the horizontal linear scale, said slide including a transparent strip extending over the top plate and circular plate, said strip being inscribed with a vertical linear scale disposed perpendicular to the first linear scale, said slide having a backing plate formed with raised lands at its opposite ends, said strip being secured to said lands, said base plate having grooves formed in outer end edges thereof, said lands having inwardly extending opposing ridges engaged slidably in said grooves, said circular edge of the hole in the top plate being outwardly and downwardly beveled toward the base plate, said circular plate having a beveled edge engaging the beveled edge of the hole in the top plate, whereby the vertical scale intersects the horizontal, radial and circular scales at all positions of the slide and circular plate on the base plate, and the radial scale extends from the center of the horizontal scale to the circular scale in all positions of the circular plate.

4. An instrument for determining trigonometric functions and for converting between polar and rectangular coordinates, comprising a base having a horizontal linear scale inscribed thereon and extending transversely across the base, a top plate having a circular hole and mounted on the base plate, a circular scale graduated in equal angular divisions around the hole in said top plate, with the horizontal linear scale extending diametrally with respect to the circular scale, a transparent circular plate mounted in said hole to rotate on a center coinciding with the center of the horizontal linear scale and the center of the circular scale with the horizontal scale visible through the circular plate, said transparent member carrying a radial linear scale substantially equal in length to a radius of the circular scale and extending from the center of the horizontal linear scale to the graduations of the circular scale, and a transparent slide movable laterally with respect to said base parallel to the horizontal linear scale, said transparent slide carrying a vertical scale perpendicular to the horizontal scale and intersecting the radial scale, the vertical scale being equal in length to the horizontal linear scale and both substantially to a diameter of the circular scale, the horizontal linear scale being graduated uniformly in fifths and units from −14.14 through 0 to +14.14, the radial scale being graduated uniformly in fifths and units from 0 to 14.14, and the vertical linear scale being graduated uniformly in fifths and units from −14.4 through 0 to +14.14, whereby the vertical scale intersects the horizontal, radial and circular scales at all positions of the slide and circular plate on the base plate, and the radial scale extends from the center of the horizontal scale to the circular scale in all positions of the circular plate.

References Cited in the file of this patent

UNITED STATES PATENTS

| | | |
|---|---|---|
| 308,040 | Prescott | Nov. 11, 1884 |
| 1,955,392 | Shimberg | Apr. 17, 1934 |
| 2,546,641 | Llanso | Mar. 22, 1951 |

FOREIGN PATENTS

| | | |
|---|---|---|
| 581,905 | Great Britain | Oct. 29, 1946 |